Patented Feb. 16, 1932

1,845,688

UNITED STATES PATENT OFFICE

FREDERICK H. UNTIEDT, OF CHEVY CHASE, MARYLAND

RUBBERIZED FABRIC AND PROCESS OF PRODUCING THE SAME

No Drawing.    Application filed November 13, 1929.    Serial No. 406,978.

This invention relates to rubberized fabrics and processes of producing the same and it comprises a rubberized fabric having a coating thereon of latex rubber firmly bound thereto by a rubber bond; it further comprises a fabric having a porous coating thereon composed of the product of drying a stiff, dense, foam containing latex, and it further comprises a process wherein a stiff dense foam containing rubber latex is applied to a fabric to be rubberized, the coated fabric dried, washed in water and, if desired, vulcanized.

There are many ways of rubberizing fabrics. Usually a coating composition consisting of crude rubber dissolved in a volatile solvent to form a pasty mass is applied to a fabric and pressed thereon so that by mere adhesion the rubber paste binds itself to the fabric. Thereafter the solvent is driven off and the coating vulcanized. Ordinarily sulphur and additional agents such as zinc oxide, are mixed in with the pasty rubber coating composition prior to application to the fabric. These processes possess disadvantages. Volatile solvents are necessary and must be recovered. Their use presents a fire hazard as well. It is also difficult, if not impossible, to secure a firm, non-peelable, union between fabric and rubber coating or a coating which will not check or chip. Most rubber coatings made in this way will in time deteriorate and may then be peeled off. It is of course difficult to saturate the upper surface of the fabric with such a paste in the hope of obtaining a firm rubber bond.

Latex is an ideal material for coating fabrics in a sense because it is highly penetrative and readily saturates the individual fibres or threads of the fabric. However, latex is almost as fluid as water and readily runs through a fabric so that relatively thick coatings of latex rubber cannot be secured by a single application of latex to the fabric. It is possible to secure a relatively thick coating of latex rubber on one side of a fabric by a series of coating operations, the latex being allowed to dry before additional applications are made.

It has been suggested to overcome this disadvantage by thickening the latex by the addition thereto of a thickening agent. Aluminum sulphate has, for example, been added to latex to accomplish this purpose.

I have now found that excellent coatings, possessing new characteristics, may be obtained upon fabrics when using the latex of commerce or other aqueous rubber dispersions provided the latex is applied to the fabric as a stiff, dense, relatively stable, foam. I spread such a foam upon the fabrics as a coating, say as much as a quarter of an inch thick and then allow the coating to dry. The dried coating is initially porous and this is advantageous in certain relations. When I wish to make a waterproof non-porous material, I simply pass the initially porous coated material between rollers or otherwise compress the coating to destroy the minute cells therein and weld the coating into a solid layer.

In my copending application, Serial Number 200,304, filed June 20, 1927 now Patent 1,777,945 of which the present application is a continuation in part, I have described ways of making such a foam. In its broadest aspects, the process comprises agitating and aerating latex containing soap or saponin or other foam stabilizing agent until a stiff, dense, relatively stable, foam is obtained. Such a foam contains minute bubbles hardly discernible with the naked eye and is much like stiffly whipped cream. Indeed the foam looks very much like whipped cream and the operation of making it on a small scale is much the same. A properly prepared foam is relatively stable in the sense that a layer thereof will dry without much, if any breakdown of the foam to its original liquid state.

More specifically, good results can be had when the foam is made as follows. To six parts by volume of latex, I add about three parts by volume of a concentrated soap solution containing from 30 to 40 percent of soap. A soap solution of this character will jell when cool and I add it to the latex while it is at a moderately elevated temperature, just warm enough so that it is sufficiently fluid to mix well with the latex. The resulting mixture is then vigorously agitated or "beaten" in such a way that volumes of air will be incorporated therein. Agitators of the eggbeater type will do this. On a large scale, it is better to provide means to positively introduce air into the mixture, for example by means of pipes terminating beneath the surface of the solution.

Vigorous agitation coupled with aeration rapidly converts the solution into a stiff dense foam. The foam should be so stiff that a half a tumbler full may be inverted without displacing the foam. The precise length of time required for complete conversion of the foregoing solution to the foam condition will of course depend somewhat upon the quantities and apparatus used. On a very small scale, with an ordinary eggbeater, seven minutes vigorous agitation is sufficient.

It should be noted however that these proportions are variable and with some latices less or more soap may be required. As little as one percent soap will suffice although the length of time the solution must be aerated and agitated is considerably increased. It is assumed that tests will be made upon small quantities of latex prior to working up large batches so that the best ratio of soap and latex may be determined in advance. Indeed with some foam stabilizing agents, much less is required. When saponin is used not so much will be necessary. Generally speaking, the mixture of latex and soap, prior to agitation and aeration, should have such a composition that the mixture will assume a somewhat pasty, thick condition upon standing for a few hours. Since the coated fabric is eventually subjected to a washing operation to wash out the soap in the dried foam, an excess of soap is not detrimental. 10 to 20 percent is an advatageous quantity. Too much soap, however, should be avoided. The proportions given above yield satisfactory results with the 30 to 35 percent latex of commerce. However prepared, the foam should be of such a consistency that, when allowed to dry in sheets, not much, if any, breakdown of the foam to a liquid condition accompanied by the formation of greatly enlarged bubbles of air, takes place. This is what I mean by a relatively stable foam. If bottled so as to prevent the evaporation of water, in time the foam will however, break down considerably yet such a foam is sufficiently stable for my purpose since it will dry out in air to form a coating or sheet.

After the foam is prepared, it is then applied to the fabric by spreading it thereon. The thickness will vary with the thickness desired in the finished material. Generally the coating as initially applied should be several times that eventually desired. A coating a quarter of an inch thick will give satisfactory results. The dense foam is evenly spread over the surface of the fabric by suitable apparatus well known in the art of coating fabrics and forming no part of this invention and then allowed to dry.

Ordinarily I find that good results are had if the coated fabric is simply exposed to ordinary room temperature conditions, say 70° F. Moderately elevated temperatures can be used but high temperatures should be avoided because they tend to break down the structure of the foam. It is of course desirable that the physical structure of the foam remain fairly constant during the drying so that not much breakdown occurs. If slight separation of liquids takes place, this is an advantage rather than the contrary because as a result the threads of the fabric become partially saturated with latex and thus, as the drying continues, a firm bond is established between the coating and the underlying threads of the fabric. If the foam be too stiff, or the quantities of stabilizing agent too great there may be less tendency for the threads of the fabric to be saturated at least partially and the dried coating may then be less firmly bonded to the fabric. It is of course desirable to establish a firm bonding between the coating and the fabric. Generally speaking, most relatively stable foams will "wet" the fabric to a sufficient degree to secure a bonding of rubber.

After the coating is practically dry, a condition easily recognized, the fabric will be covered with a porous, absorbent, surface of latex rubber and foam stabilizing agent and the thickness thereof will not be very much less than that of the wet foam as applied.

The material thus prepared is an intermediate raw material from which finished coatings of varying characteristics can be prepared, and constitutes an important feature of my invention. It can be further processed to yield either a porous coated fabric or a water-proof, non-porous, fabric. If the coated material is gently washed in water, as by immersion in a tank thereof or by passing through a trough, the soap or other foam stabilizer is easily washed out. After the washed, coated, fabric is allowed to dry, the coating thereon will be found to be porous. It absorbs water and, when the coated surface is wetted, the water penetrates through to the underside of the fabric.

Porous material of this sort may be put to numerous uses. For example, surgical belts are improved when the rubber portions thereof can take up moisture. The material is also an effective filter for removing finely divided dust from gases, as a separator in storage batteries, etc.

When it is desired that the coating shall be waterproof, the intermediate dried materiel is washed as before and then subjected to pressure to destroy the porous character. This is a simple operation. Passage between rollers or other methods can be used. Alternatively the intermediate raw material can be compressed to destroy the air cells and then washed to remove the soap. This procedure seems to result in a somewhat softer finished product and is to be preferred.

The finished rubberized fabric whether the coating be porous or homogenous throughout, has a soft "feel" and is not so characteristically "rubbery" as rubberized fabrics prepared in the ordinary way. The color is a pure white and the "feel" is more like a fine suede leather than rubber. Such coated fabrics are somewhat lighter in weight than ordinary fabrics and are useful in many relations, aside from those to which ordinary rubberized fabrics are put.

The finished fabric can be vulcanized by the cold processes usually used for vulcanizing latex rubber in sheet form and the vulvanization forms no part of the present invention per se. It may further be noted that fillers can be incorporated in the rubber coating by mixing such fillers with the latex-foam stabilizer mixture prior to conversion thereof into the foam condition. Some discretion must of course be used in this connection. If the fillers inhibit foam formation in an ordinary soap solution, a foam stabilizing agent such as saponin should be chosen. Saponin is uneffected by electrolytes which ordinarily prevent the foaming of soap.

In the appended claims, I mean the term "rubber latex" to include aqueous dispersions of rubber generally, such as the "synthetic latices". By the term "fabrics" I mean to include tire cords and other types of woven material as well as the fabric backings usually rubberized. Tire cords can of course be coated with the dense foam to form a rubber coated cord, porous or otherwise.

Having thus described my invention, what I claim is:

1. The process of providing textile fabrics with a coating or layer of rubber which includes the steps of applying to the fabric a layer of a dense, relatively stable aqueous foam containing a rubber latex as the rubber constituent thereof, drying the foam whereby a porous rubber layer is formed, and compressing the dried layer to decrease its porosity to the desired extent.

2. The process of providing textile fabrics with a coating or layer of rubber which includes the steps of applying to the fabric a layer of a dense, relatively stable aqueous foam containing a rubber latex as the rubber constituent thereof, drying the foam whereby a porous rubber layer is formed, compressing the dried layer to decrease its porosity to the desired extent, and vulcanizing the rubber.

3. The process as in claim 1 wherein the dried porous layer is compressed to an extent sufficient to yield a substantially non-porous, waterproof coating on the fabric.

4. The process as in claim 2 wherein the dried porous layer is compressed to an extent sufficient to yield a substantially non-porous, waterproof coating on the fabric.

FREDERICK H. UNTIEDT.